Oct. 10, 1967  O. W. FOSS  3,345,921
METHOD OF MAKING A BOX
Filed April 19, 1965  2 Sheets-Sheet 1
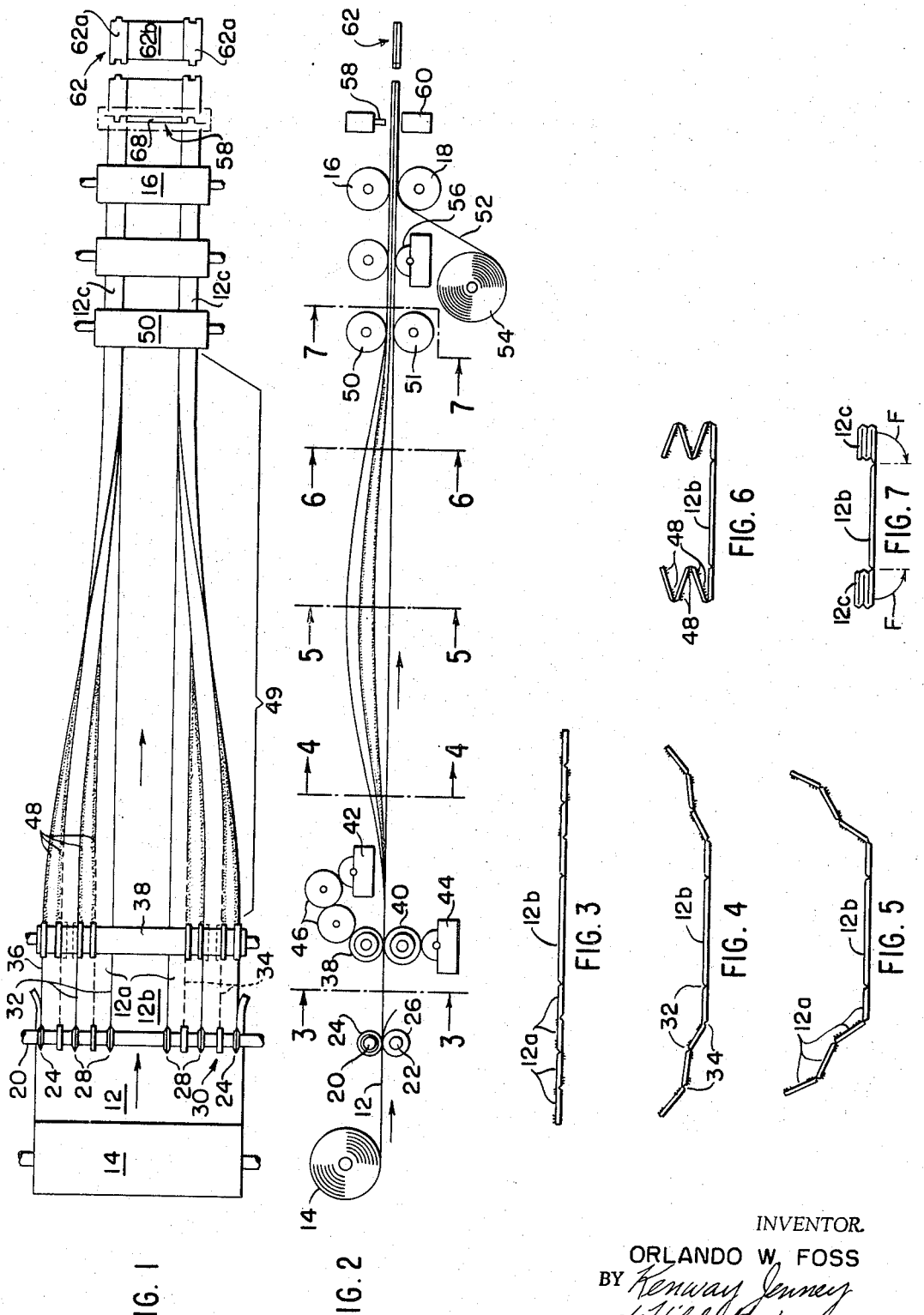
INVENTOR.
ORLANDO W. FOSS
BY Kenway Jenney
+ Hildreth
ATTORNEYS Oct. 10, 1967   O. W. FOSS   3,345,921
METHOD OF MAKING A BOX
Filed April 19, 1965
2 Sheets-Sheet 2

INVENTOR.
ORLANDO W. FOSS
BY Kenway Jenney
& Hildreth
ATTORNEYS

United States Patent Office 3,345,921
Patented Oct. 10, 1967

3,345,921
METHOD OF MAKING A BOX
Orlando W. Foss, c/o General Box Company, P.O. Box 772, 710 Haines Ave., Waycross, Ga. 31501
Filed Apr. 19, 1965, Ser. No. 448,938
6 Claims. (Cl. 93—36)

The present invention relates generally to box construction, and more particularly to improvements in the method for manufacturing cardboard boxes described in my Patent No. 3,113,492.

The above patent describes a method of forming a box of two laminated blanks each comprising two opposing, relatively stiff, laminated side panels and an unlaminated central panel. The blanks are arranged in overlying relationship with the side panels forming a quadrilateral. The edges of the side panels have mortises and tenons which are then interlocked to form tight corners. The method contemplates the lamination of multiple plies of cardboard stock derived from a plurality of webs of material, the patent showing a total of four feed rolls for this purpose, each supplying a separate ply in the side panel.

The method of said patent requires care in the alignment of the several rolls and webs so as to produce laminated sides of accurate dimensions having smooth, even edges. In the alternative, it is necessary to provide slitters to cut the edges of the web or webs after lamination and to collect the waste formed thereby.

It is an object of this invention to eliminate or substantially reduce the problems attendant upon aligning a plurality of rolls and webs. A second object is to reduce waste in carrying out the process.

A further object is to achieve the advantages of the prior method and to manufacture boxes of the type produced thereby with the use of simplified, high speed machinery.

With the above and other objects hereinafter appearing in view, the features of this invention include the manufacture of blanks of the type produced by the prior method, but employing a single supply roll to provide a plurality of pleats that become the plies in the side panel construction. According to this invention, a web is folded longitudinally as it is fed through the machine, thereby building up the side panels to the required thickness. It has been found that this substantially reduces the difficulty of obtaining accurate edge alignment, as will be more clearly evident from the following description.

Another feature resides in longitudinally scoring or partially slitting the web at accurately spaced intervals, thereby forming a plurality of pleats that are thereafter folded in accordion fashion to build up the side portions of the web prior to severing it laterally into separate blanks.

Other features of the invention reside in certain details of the method and in modes of operation that will be more clearly understood from the following description of a preferred method hereinafter described with reference to the appended drawings, in which FIG. 1 is a plan view of a blank forming machine adapted to carry out the method of this invention;

FIG. 2 is a side elevation of the machine;

FIGS. 3 to 7 are side elevations in section, taken on lines 3—3 to 7—7, respectively, of FIG. 2, showing the folding up of the pleats of the web;

Figure 12:
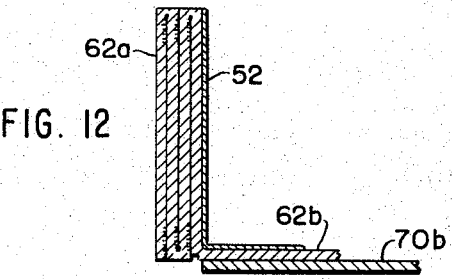
Figure 13:
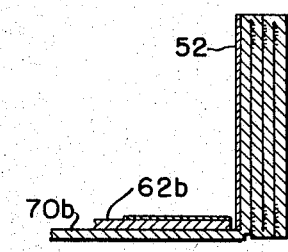
Figure 11:
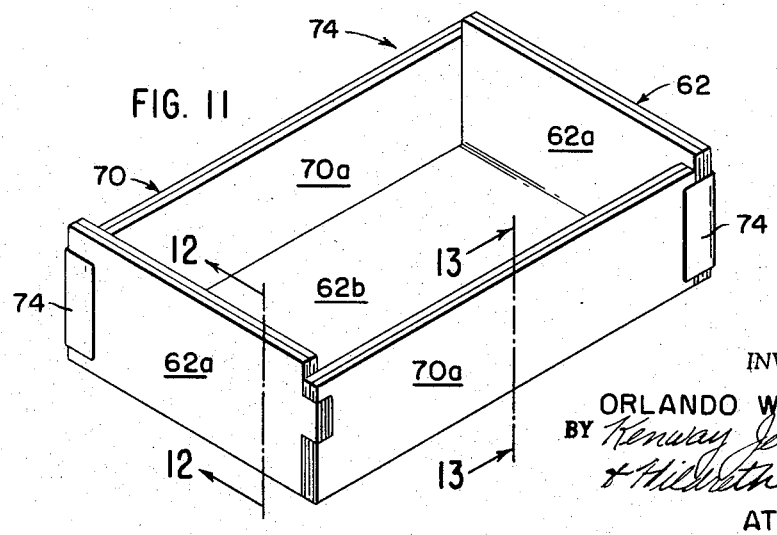
FIG. 11 is a diagonal view of a set-up box in completed form.

FIGS. 12 and 13 are elevations in section taken on lines 12—12 and 13—13 of FIG. 11.

Referring to FIGS. 1 to 7, a single web 12 is fed continuously from a supply roll 14 by a pair of feed rolls 16 and 18 driven in a conventional manner at constant speed. The web is preferably formed of cardboard stock of sufficient thickness to produce relatively stiff side panels when formed with the desired number of plies. The width of the web equals the lateral dimension of the central portion of the web, plus at least twice the lateral dimension of a side panel times the number of plies to be formed.

The web 12 passes under a shaft 20 opposed by a shaft 22. The shaft 20 bears a pair of trim cut-off knives 24 respectively opposed by back-up rolls 26 on the shaft 22. These knives are accurately positioned laterally of the web. If the web is supplied in an accurately controlled width they can be eliminated.

The shafts 20 and 22 also bear a number of scoring rolls 28 and corresponding back-up rolls 30 arranged in pairs. The scoring rolls are designed to crease or partially slit the web, according to the character of the stock employed, the object being to weaken the material sufficiently to permit it to be folded flat upon itself as hereinafter described.

The scoring rolls are also alternated in arrangement with the back-up rolls so as to weaken the material to facilitate pleating in accordion fashion. Thus top score lines 32 and bottom score lines 34 are formed.

The score lines are accurately spaced in relation to one another and in relation to the trimmed edges 36 of the web so as to define as many pleats 12a as there are plies to be formed in each side of the completed box, and also to define a central portion 12b. The pleats 12a are of equal width.

The web 12 then passes between strip gluing rolls 38 and 40 replenished by suitable glue reservoirs 42 and 44, respectively. The reservoirs are provided with dip rolls which are in contact with the gluing rolls or with glue transfer rolls 46 in a conventional manner. The gluing rolls are spaced in position to apply narrow bands of glue 48 to the web for bonding the pleats together.

The web 12 leaves the gluing rolls and passes through a pleating section 49 to pressure rolls 50 and 51. In this section the web is progressively folded with each of the score lines 32 and 34 on the outside of the fold, as shown in FIGS. 3 to 6. Guide rails may be provided in this section to facilitate pleating, if desired. The bands of glue 48 are thus brought into contact with the edges of contiguous pleats, thus forming multiplied side portions 12c with upper score lines 32 defining the boundaries of the central portion 12b.

Figure 8:
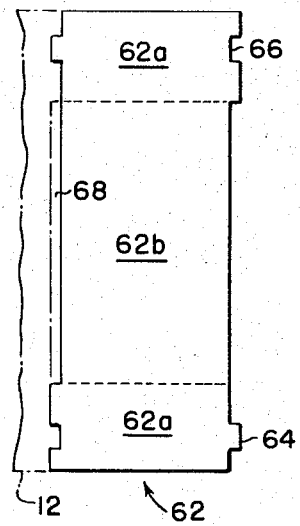
FIGS. 8 and 9 are views showing the several blanks forming a box prior to assembly.

If desired, the cardboard may already have a layer of lining paper as supplied on the roll 14, in which case the lined side is on the under side of the web 12 as viewed in FIG. 2, which is the visible side in FIG. 8. If the web is not lined as supplied, a web 52 of lining paper may be fed from a supply roll 54 and applied to the web. For this purpose glue is preferably applied by a replenished gluing roll 56 to the under surface of the web as it leaves the rolls 16 and 18. The web 52 has the width of the central portion 12b and both side portions 12a. The lining paper is bonded to the web 12 by the drive rolls 16 and 18.

Finally, the web passes under a cut-off die 58 which cooperates with an anvil 60 to produce a blank 62. Each blank has a central panel 62b and two side panels 62a. The cut-off die may be operated in any conventional manner to produce a blank having a dimension longitudinally of the web that equals one of bottom dimensions of the desired box, while the width of the panel 62b equals the other.

The die 58 is shaped to produce a mortise 64 in one of the side panels (FIG. 8) and a tenon 66 in the other. A small strip 68 is also removed by the die from the central portion of the web, the width of said strip, the mortise and the tenon being all substantially equal.

Figure 9:
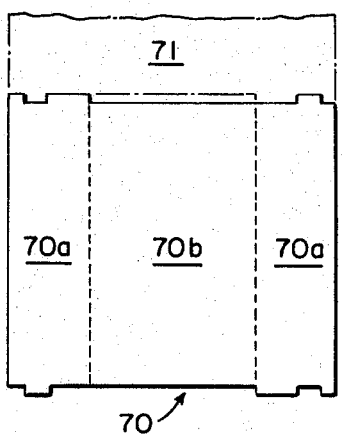

To make a complete box, it is also necessary to produce a blank 70 which is of the same construction and is produced in substantially the same manner as the blank 62. The width and length of the central panel 70b are the reverse of the panel 62b. The blank 70 is lined on only the side panels 70a, which are the visible sides in FIG. 9.

Figure 10:
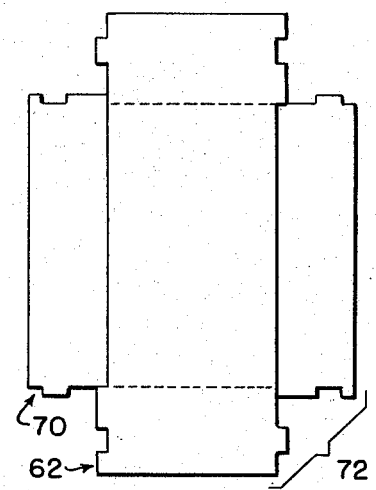
FIG. 10 is a view of the blanks assembled to form a composite, flat assembly.

To form a box, the blank 62 is placed over the blank 70 as shown in FIG. 10, and if desired the central panels 62b and 70b may be glued together. The result is a finished box blank 72.

Then the side panels of the box blank may be folded as indicated by the arrows F in FIG. 7 (toward the viewer in FIG. 10) and the respective mortises and tenons may be joined in the same manner as described in said patent. A corner stay paper 74 may be glued in place over each joint.

The sides of one of the blanks may be somewhat higher than those of the other in order to accommodate a hinged box top, as described in said patent.

It will be seen from the foregoing that I have provided an improved box construction substantially like that of said patent, but with the use of only one supply roll of cardboard. Because of the accurate setting of the scoring rolls 28, the accurate dimensions and even, precise alignment of all plies in the side panels are assured. The result is a box 74 of accurate construction having all the attributes obtained by the prior method but with greater economy of material, greater speed and fewer adjustments of the parts.

While the invention has been described in a preferred form, it will be understood that certain variations may be made. For example, the lining paper may be applied to other panels than those that comprise the inner surfaces of the box. Also, the completed box 74 may be covered by a suitable finish paper on the outside surfaces, as is commonly done with cigar boxes. Also, other mortise and tenon arrangements may be employed, and these may be of any desired shape, one well-known variant being a dove-tail joint familiarly employed in wooden drawer construction.

Other variations in the method may also be employed without departing from the spirit or scope of the invention.

Having thus described the invention, I claim:

1. The method of making a box comprising the steps of forming a pair of blanks, each blank being formed by feeding a web, scoring the web longitudinally along a plurality of lines to form a set of pleats adjacent each edge thereof separated by a central portion, folding the pleats upon one another to form a pair of side portions each having a plurality of plies, and severing the web transversely,
placing the blanks one upon the other so that their side portions form a quadrilateral, and
erecting the sides to form the box.

2. The method according to claim 1 in which the web is fed continuously in the forming of the blanks.

3. The method according to claim 1 in which the plies are adhesively bonded together after the folding step and before the severing step.

4. The method of making a box comprising the steps of forming a pair of blanks, each blank being formed by feeding a web continuously, scoring the web longitudinally along a plurality of lines to form a set of pleats adjacent each edge thereof separated by a central portion, the score lines alternating from one side to the other between the central portion and the edge of the web, folding the pleats in accordion fashion and adhesively bonding them together to form a pair of side portions each having a plurality of plies, and severing the web transversely,
placing the blanks one upon the other so that their side portions form a quadrilateral, and
erecting the sides to form the box.

5. The method according to claim 4, wherein mortises and tenons are formed in the edges of the side portions of the blanks when they are severed from the web, said mortises and tenons being fitted together when the sides of the box are erected.

6. The combination according to claim 4 in which lining paper is adhesively bonded to the web after the side portions are formed by the folding of the pleats and before the blanks are severed from the web.

References Cited
UNITED STATES PATENTS

| | | | |
|---|---|---|---|
| 2,843,305 | 7/1958 | Myers | 229—30 |
| 3,113,492 | 12/1963 | Foss | 93—36 |
| 3,157,346 | 11/1964 | Hamilton | 229—23 |

BERNARD STICKNEY, *Primary Examiner.*